(No Model.) 2 Sheets—Sheet 2.
J. M. KELLOGG.
ANIMAL TRAP.
No. 578,244. Patented Mar. 2, 1897.
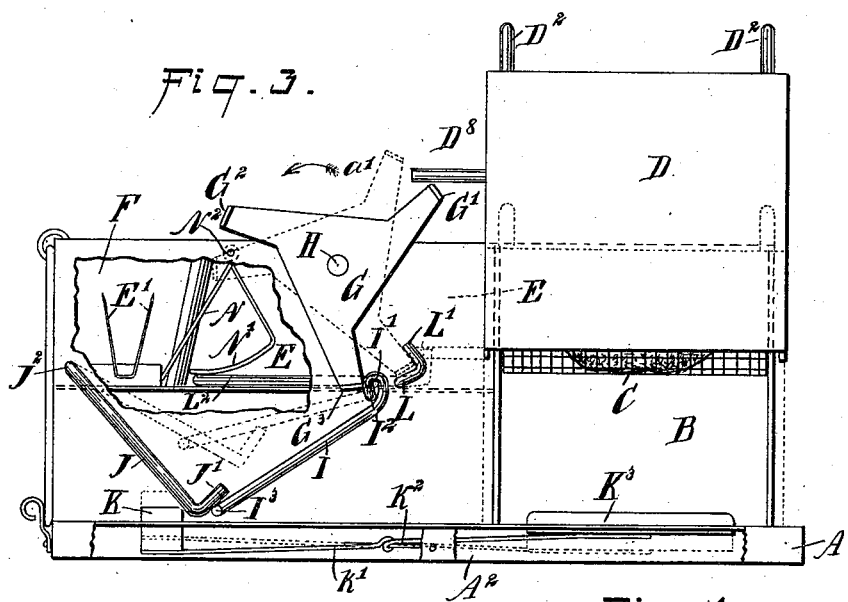
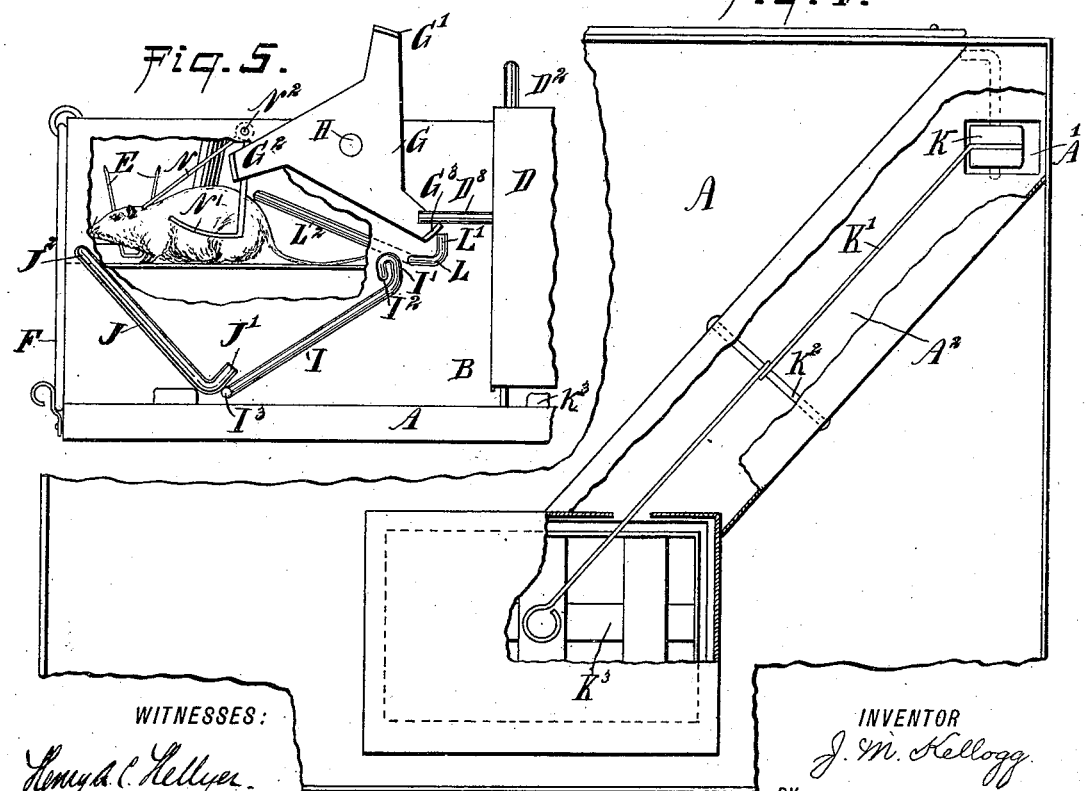
WITNESSES:
INVENTOR
J. M. Kellogg
BY
ATTORNEYS.

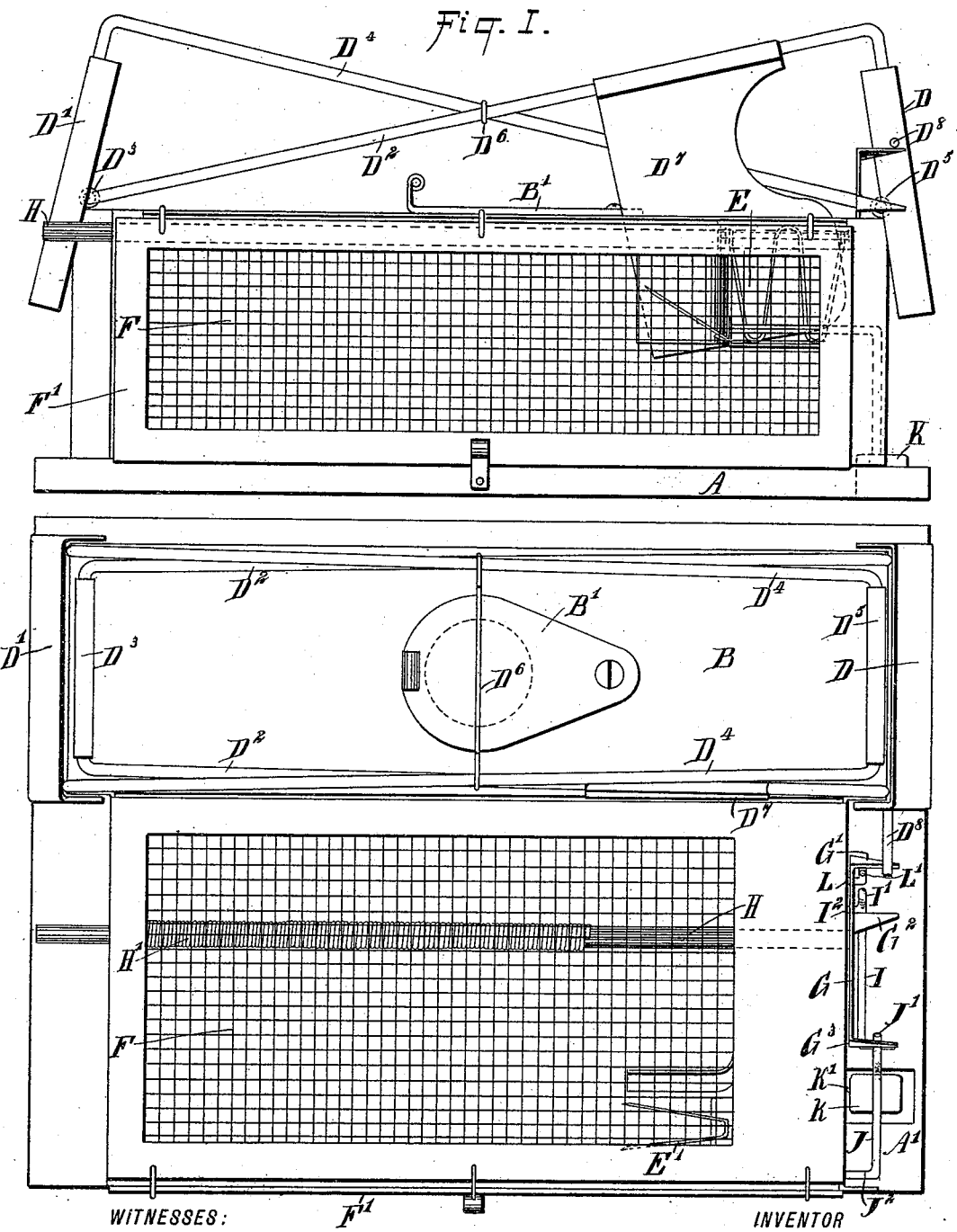

UNITED STATES PATENT OFFICE.

JAMES M. KELLOGG, OF BOZEMAN, MONTANA.

ANIMAL-TRAP.

SPECIFICATION forming part of Letters Patent No. 578,244, dated March 2, 1897.

Application filed April 1, 1896. Serial No. 585,734. (No model.)

*To all whom it may concern:*

Be it known that I, JAMES M. KELLOGG, of Bozeman, in the county of Gallatin and State of Montana, have invented a new and Improved Animal-Trap, of which the following is a full, clear, and exact description.

The object of the invention is to provide a new and improved animal-trap which is simple and durable in construction, self-setting, and more especially designed for catching small animals, such as mice, rats, rabbits, &c., in large numbers without requiring attention on the part of the operator.

The invention consists principally of a spring-pressed lifting-wheel for automatically closing the inlet door or doors, a releasing device for said wheel to permit the latter to close the doors, and an automatic resetting device for said wheel for causing the latter to open said doors.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a side elevation of the improvement. Fig. 2 is a plan view of the same. Fig. 3 is an end elevation of the same with part broken out. Fig. 4 is an inverted plan view of the same with part broken out, and Fig. 5 is a partial end elevation with part broken out.

The animal-trap is mounted on a suitable base A, on the top of which is arranged an entrance-chamber B, containing a bait-cage C, to which access is had from the top of the chamber by a suitable door B', as indicated in Figs. 1 and 2. The ends of the chamber B are open when the trap is set, and the ends are adapted to be closed by doors D D', of which the door D is provided at its upper end with longitudinally-extending arms $D^2$, fulcrumed on the top of the chamber B near the door D'. The latter is provided with longitudinally-extending arms $D^4$, fulcrumed on the top of the chamber near the door D, so that the two arms $D^2$ and $D^4$ cross each other at or near their middle, and said arms are loosely connected with each other at their crossing-point by a wire loop $D^6$, secured on the arm $D^2$ and engaging with its loops the arm $D^4$. Thus when one door is moved up or down the other door will move in the same direction by the section of the arm $D^6$.

The inside of the chamber B is connected by a gangway or tube E with a cage F, arranged alongside the chamber B on the top of the base A. The gangway E is near the top of the chamber B and cage F, and the inner end of said gangway opens longitudinally into the cage F, and the entrance to the latter is protected by barbs E' to prevent an animal passing into the cage F from returning to the gangway or tube E.

The inlet to the tube or gangway E is normally closed by a door $D^7$, secured on the arm $D^2$ and moving with the doors D D', said door $D^7$ being so constructed that when the doors D D' close the chamber B then the door $D^7$ opens the entrance to the gangway E to permit an animal caught in the chamber B to pass through the tube E into the cage F, and also that when the doors D D' open the chamber B the door $D^7$ is closed to prevent the animal passing back from the gangway E to the chamber B before entering the cage F.

In order to automatically lift the doors D D' and permit the same to close by their own weight, I provide a lifting-wheel G, having a number of arms G' $G^2$ $G^3$, adapted to alternately engage a pin $D^8$, projecting laterally from one side of the door D. The lifting-wheel G is secured on the outer end of a longitudinally-extending shaft H, mounted to turn in suitable bearings in the sides of the cage F, said shaft extending through the latter near the top thereof, as is plainly indicated in the drawings.

On the shaft H is coiled a spring H', fastened at one end to said shaft and at the other end to a part of the cage F, so that when the shaft is turned to wind up the spring H' said spring by its tension tends to rotate the shaft H in the direction of the arrow $a'$ (see Fig. 3) and cause one of the arms G' $G^2$ $G^3$ of the wheel G to engage the pin $D^8$, so as to lift the door D from a closed to an open position, as shown in Figs. 1 and 3. When this has taken place, the lowermost arm $G^3$, as shown in Fig. 3, abuts against a projection I', formed on the fulcrum end of an arm I, fulcrumed at $I^2$ in the side of the cage F, the free end of said arm being provided with a projection I³, engaged by a projection J' on a locking-arm J, likewise fulcrumed at J² in the side of the cage F, said locking-arm serving to normally lock the arm I in place to hold the wheel G in position.

The locking-arm J is adapted to be swung upward by a block K, projecting upwardly through an opening A' in the base A, said block K being held on the outer end of a lever K', fulcrumed at K² and extending through a diagonally-extending slot or channel A², formed in the base A. (See Figs. 3 and 4.) The inner end of the lever K' supports a platform K³, extending upwardly through an opening in the bottom of the chamber B at or near the middle thereof, preferably directly under the bait-cage C, so that an animal entering the chamber B and passing upon the platform K³ causes said platform K³ to move downward by the weight of the animal to impart a swinging motion to the lever K'. When this takes place, the block K moves upward and gives an upward swinging motion to the locking-arm J, whereby the arm I is free to swing upward, caused by the pressure of the arm G³ on the projection I'.

Now it will be seen that when the arm I swings upward the projection I' finally releases the arm G³, so that the wheel G turns in the direction of the arrow $a'$ to move the arm G' from under the pin D⁸, so that the doors D D' are free to drop by their weight, and in doing so the doors close the ends of the chamber B. When the arm G' moves from under the pin D⁸, then the wheel G is again locked in place by the arm G³ engaging a projection L' on a tripping-lever L, fulcrumed in the side of the cage F and extending in the bottom of the gangway or tube E, the lever L being provided within the latter with a longitudinally-extending arm L², normally resting on the bottom of the gangway. (See Fig. 3.)

The arm L² of the tripping-lever is normally locked in place by an arm N', extending from the pivot N² of a gate N, normally closing the inner end of the tube or gangway E, said gate N extending in an inclined direction with its pivot N² on the top of the gangway, so that an animal passing along the latter can reach the cage F and lift said gate N, and in doing so move the arm N' from the arm L², and consequently the latter can swing upward by the action of the arm G³ on the projection L' of the lever L. When this takes place, the wheel G again turns by the action of the spring H', and the arm G³ now engages the under side of the pin D⁸, as the doors D D' are in a lowermost or closed position, and as the wheel G rotates it pushes the pin D⁸ upward, thereby moving the doors D D' in a like direction, so that the chamber B is again opened. In the meantime the arm I has moved back to its normal position as the platform K³ returns to its normal position by the weighted block K, and consequently the arm G² moves against the projection I' of said arm to lock the wheel G again in position.

Now it will be seen that by the arrangement described the wheel G receives an intermittent rotary motion, the first part of the motion being for relieving the pin D⁸ to allow the doors to close, the second part of the motion being to lift the doors so as to open the chamber B.

The operation is as follows: When the several parts are in the position illustrated in Figs. 1 and 3, then the doors D D' are open to permit an animal to walk into the chamber B at either end. When the animal passes into this chamber and finally steps upon the platform K³, then the wheel G is released, as previously explained, to permit the doors D D' to drop and close the chamber B. When the doors close, the entrance opening to the gangway or tube E is opened by the door D⁷, so that the animal caught in the chamber B can pass into said gangway and out of the same into the cage F, but in doing so the animal lifts the gate N to again release the wheel G, as above explained, so that the wheel G lifts the doors back to their previous or open position and at the same time closing the entrance to the gangway or tube E from the chamber B by the closing of the door D⁷, and thereby preventing the return of the animal from the gangway to the chamber. A return of the animal from the cage F to the chamber is prevented by the barbs E', the gate N, and the door D⁷, so that the animal is not liable to escape from the cage F. It will further be seen that the animal in passing from the chamber B to the cage F resets the trap.

Having thus fully described my invention, I claim as new and desire to secure by Letters Patent—

1. An animal-trap, comprising an entrance-chamber, a cage, a gangway connecting the chamber with said cage, doors for closing said chamber, a spring-pressed wheel for controlling said doors, a platform held in the bottom of said chamber and connected with said wheel to release the latter, and a door for opening and closing the entrance to said gangway, said door moving with the chamber-doors, substantially as shown and described.

2. An animal-trap having an entrance-chamber, a cage communicating with the entrance-chamber, a spring-pressed shaft, a wheel fixed to the shaft, the wheel having arms projecting outward therefrom, a door for the entrance-chamber, the arms of the wheel being capable of engaging a portion of the door to lift the door, an arm located between the entrance-chamber and cage, the arm having a projection capable of engaging the arms of the wheel to stop the movement thereof, a second and pivotally-mounted arm located adjacent to the projection of the first arm and capable of being engaged by the arms of the wheel immediately prior to the engagement of the arms of the wheel within the projection of the first arm, a locking-arm capable of engaging the second arm to hold the same from movement, a lever fulcrumed at the under portion of the cage, a block carried by one arm of the lever and engaging the locking-arm, and a platform carried by the opposite end of the lever and located within the entrance-chamber, substantially as described.

3. A trap having an entrance-chamber, a cage in communication with the entrance-chamber, a door for the entrance-chamber, an arm pivotally mounted between the entrance-chamber and cage, a gate pivoted adjacent to the arm and having a portion engaging the same, the arm having a projection extending out of the trap, a shaft revolubly mounted in the trap, a spring pressing the shaft, an armed wheel fixed to the shaft, the arms of the wheel being capable of engaging the projection of the arm and of engaging a part of the door to lift the door, a second arm pivoted in the trap and engaged by the arms of the wheel, the second arm being engaged immediately before the engagement of the wheel with the projection on the first arm, a locking-arm engaging the second arm, a lever fulcrumed beneath the trap, a block carried by one arm of the lever and engaging the locking-arm, and a platform carried by the opposite end of the lever and located within the entrance-chamber, substantially as described.

4. A trap having an entrance-chamber, a cage in communication with the entrance-chamber, a lever fulcrumed beneath the trap, the lever extending to the entrance-chamber, a locking-arm capable of being tripped by the lever, a shaft revolubly mounted in the trap, a spring pressing the shaft, an armed wheel carried by the shaft, a pivotally-mounted arm located between the entrance-chamber and the cage, the arm having a projection engaged by the arms of the wheel, means adjacent to the arm by which the arm is removably held from movement, a second arm capable of being engaged by the arms of the wheel, the second arm being normally held by the locking-arm, and a door capable of being raised by the arms of the wheel, substantially as described.

JAMES M. KELLOGG.

Witnesses:
A. BINDEWAHL,
I. K. WISNER.